United States Patent [19]
Kline et al.

[11] Patent Number: 5,855,182
[45] Date of Patent: Jan. 5, 1999

[54] FLOOR SHIFTER AND CONSOLE ASSEMBLY

[75] Inventors: Scott Andrew Kline, New Baltimore; Steven Andrew Ramirez, Sterling Heights; Esther Purify, Southfield, all of Mich.

[73] Assignee: General Motors Corporation, Detroit, Mich.

[21] Appl. No.: 723,416

[22] Filed: Sep. 30, 1996

[51] Int. Cl.[6] ........................................................ G09F 9/00
[52] U.S. Cl. .................................. 116/28.1; 116/DIG. 20; 116/281
[58] Field of Search ............................ 180/336; 116/28.1, 116/321, 323, DIG. 20, 324, 281, 282, 283; 192/4 R

[56] References Cited

U.S. PATENT DOCUMENTS

| | | | |
|---|---|---|---|
| 3,896,759 | 7/1975 | Ogura ....................................... | 116/28.1 |
| 4,565,151 | 1/1986 | Buma ....................................... | 116/28.1 |
| 4,580,518 | 4/1986 | Scanlon et al. .......................... | 116/28.1 |
| 4,798,160 | 1/1989 | Mochida et al. ........................ | 116/28.1 |
| 5,159,892 | 11/1992 | Hara et al. .............................. | 116/28.1 |
| 5,582,073 | 12/1996 | Takeuchi et al. ....................... | 116/28.1 |

*Primary Examiner*—Elizabeth L. Dougherty
*Assistant Examiner*—Willie Morris Worth
*Attorney, Agent, or Firm*—Donald F. Scherer

[57] ABSTRACT

In automobiles incorporating a console-mounted shift lever assembly for an automatic transmission control, a range indicator assembly is attached to the shift lever assembly to form a subassembly. This subassembly is secured in the automobile by attaching the shift lever to the vehicle floor pan, inserting a console housing over the shift lever assembly and clipping the range indicator assembly to the console. The range indicator assembly has an indicator extension or post that mates with a shifter alignment feature or bracket on the base of the shift lever assembly. This mating establishes the fore/aft location of the range indicator assembly relative to the shift lever assembly. The clips cooperate with the console to determine vertical and transverse locations of the range indicator assembly. A trim plate is placed over the opening in the console and secured to the console by clip members. This effectively closes the opening around the range indicator assembly and the shift lever assembly. A flag driver on the range indicator assembly is operatively connected with the shift lever on the shift lever assembly at the time of subassembly to assure proper alignment of the indicator flag in the shift lever position relative to the indicia formed on the indicator assembly.

2 Claims, 6 Drawing Sheets ized shift lever

FLOOR SHIFTER AND CONSOLE ASSEMBLY

TECHNICAL FIELD

This invention relates to console shift lever and indicator assemblies for automatic transmissions.

BACKGROUND OF THE INVENTION

Many vehicles have a console-mounted transmission shifter consisting of a shift lever assembly, a console trim plate and a trim closing plate. The console trim plate has an opening for a lever which is a component of the shifter assembly and a transmission indicator, often termed "PRNDL" which informs the operator of the selected operating mode of the transmission. The trim plate is not located relative to the shifter assembly in either the longitudinal or transverse direction of the vehicle. This assembly generally then requires an adjustment of the PRNDL relative to the shift lever for accurate presentation of the transmission operating condition.

SUMMARY OF THE INVENTION

It is an object of present invention to provide an improved floor shifter and indicator assembly for vehicles employing a console mounted shifter for an automatic transmission.

In one aspect of the invention, the shift lever assembly includes an alignment bracket which cooperates with an alignment post on an indicator assembly. The indicator assembly includes indicia to inform the operator of the transmission operating condition selected through manipulation of the shift lever. The indicator assembly also includes a flag and driver which are alignable with the PRNDL indicia. The driver is assembled over the shift lever prior to assembly in the vehicle. The alignment post is inserted in the alignment bracket at assembly with the console to fix the longitudinal relation between the indicia and the shift lever assembly. This eliminates the need for adjustment after the trim plate has been installed. The indicator assembly also has clip members which secure it to a console in both vertical and transverse orientation but permit longitudinal freedom. A trim plate is also clipped to the console to close the opening around the indicator assembly and above the shift lever assembly.

It is preferable to assemble the shift lever assembly within a vehicle in the following manner. Secure the shift lever and indicator assembly to the floor pan of a vehicle while the indicator assembly is restrained upward on the shift lever member. Install a console for the shift lever assembly and under a portion of the instrument panel, and secure the console to the vehicle floor. Remove the restraint from the indicator assembly, such that the indicator assembly can be moved downward on the shift rod whereby the longitudinal fore/aft alignment is accomplished through the post and bracket and clip members secure the indicator assembly within the console for transverse and vertical alignment or positioning. This is followed by the installation of a trim cap or cover which is also clipped to the console assembly and provides a close-out for the opening above the shift lever assembly and around the indicator assembly.

DESCRIPTION OF AN EXEMPLARY EMBODIMENT

Figure 1:
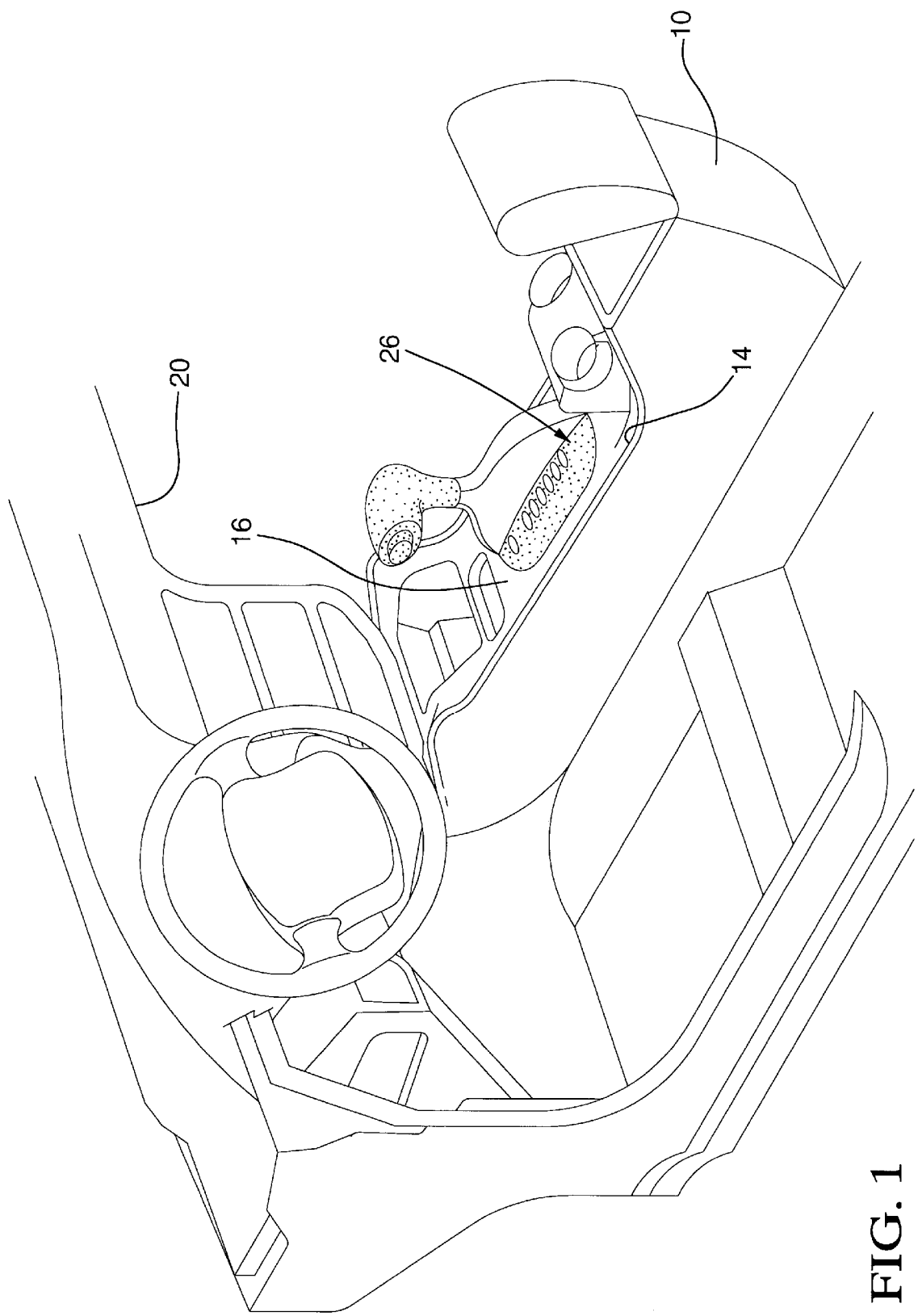
FIG. 1 is an isometric assembly view of a vehicle console shift lever and indicator.
Figure 2:
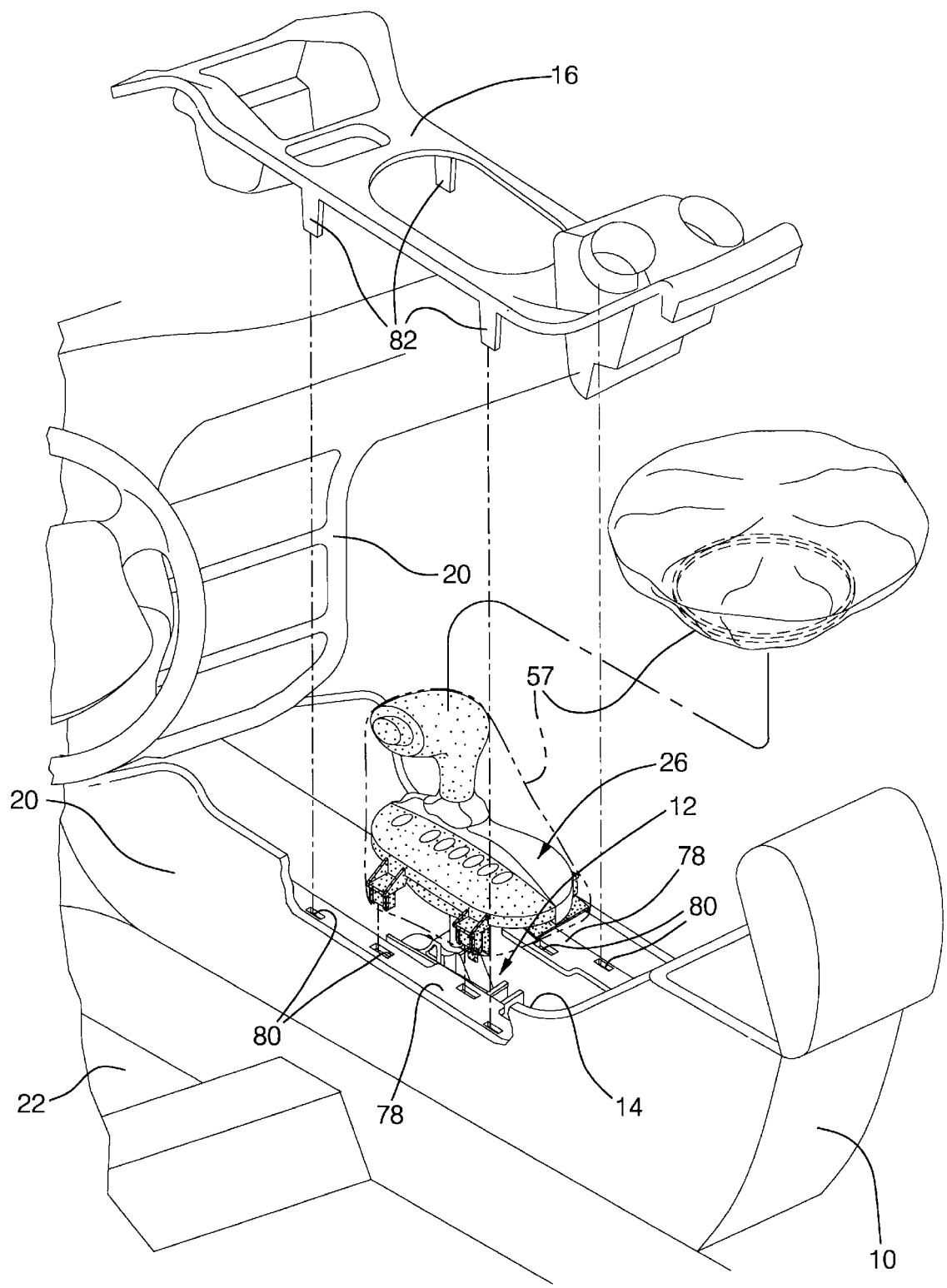
FIG. 2 is an exploded view of the assembly in FIG. 1.

Referring to the drawings, wherein like characters represent the same or corresponding parts throughout the several views, there is seen, particularly in FIG. 1, a vehicle shift lever assembly for a console type transmission shift lever. The assembly includes a console 10 in which is disposed a shift lever and indicator assembly 12. An opening 14 in the console 10 which surrounds the indicator assembly is closed with a trim cap or cover 16. The console 10 has a forward end 18 which is positioned under a conventional instrument panel 20. The console 10 is secured to a vehicle floor 22.

As best seen in FIGS. 2 through 6, the shift lever and indicator assembly 12 includes a shift lever assembly 24 and an indicator or indicia assembly 26. The shift lever assembly 24 has a base member 28 which is secured to the vehicle floor 22 by a plurality of conventional threaded fasteners 30. The base 28 has pivotally mounted, in a conventional manner, a shift lever 32 which is pivotable by the operator through a handle 34 to select a plurality of transmission operating conditions as represented by indicia 36.

The lever also has connected therewith a detent spring 38 which is operatively connected with a detent plate 40. Detent plate 40 has a plurality of notches which, as is well known, will maintain the shift lever 32 in the desired operating position through a detent roller 42 which is secured to the spring 38. Thus, the operator will pivot the shift lever through manipulation of the handle 34 to the desired transmission operating condition. To provide for release a secondary detent lever 44 which cooperates with a secondary detent plate 46 and a BTSI (Brake-Transmission Shift Interlock) interlock lever 48, a detent button 50 is provided in the handle 34. The operation of the interconnections of the button 50 and the detent 44 are well known such that further description is not considered to be necessary.

The BTSI lever 48 is controlled by an electrically actuated electromagnetic device 52 which is operable in a well known manner to restrain the shift lever assembly in a "Park" position until the operator disengages the electromagnetic device through actuation of the brake.

Figure 3:
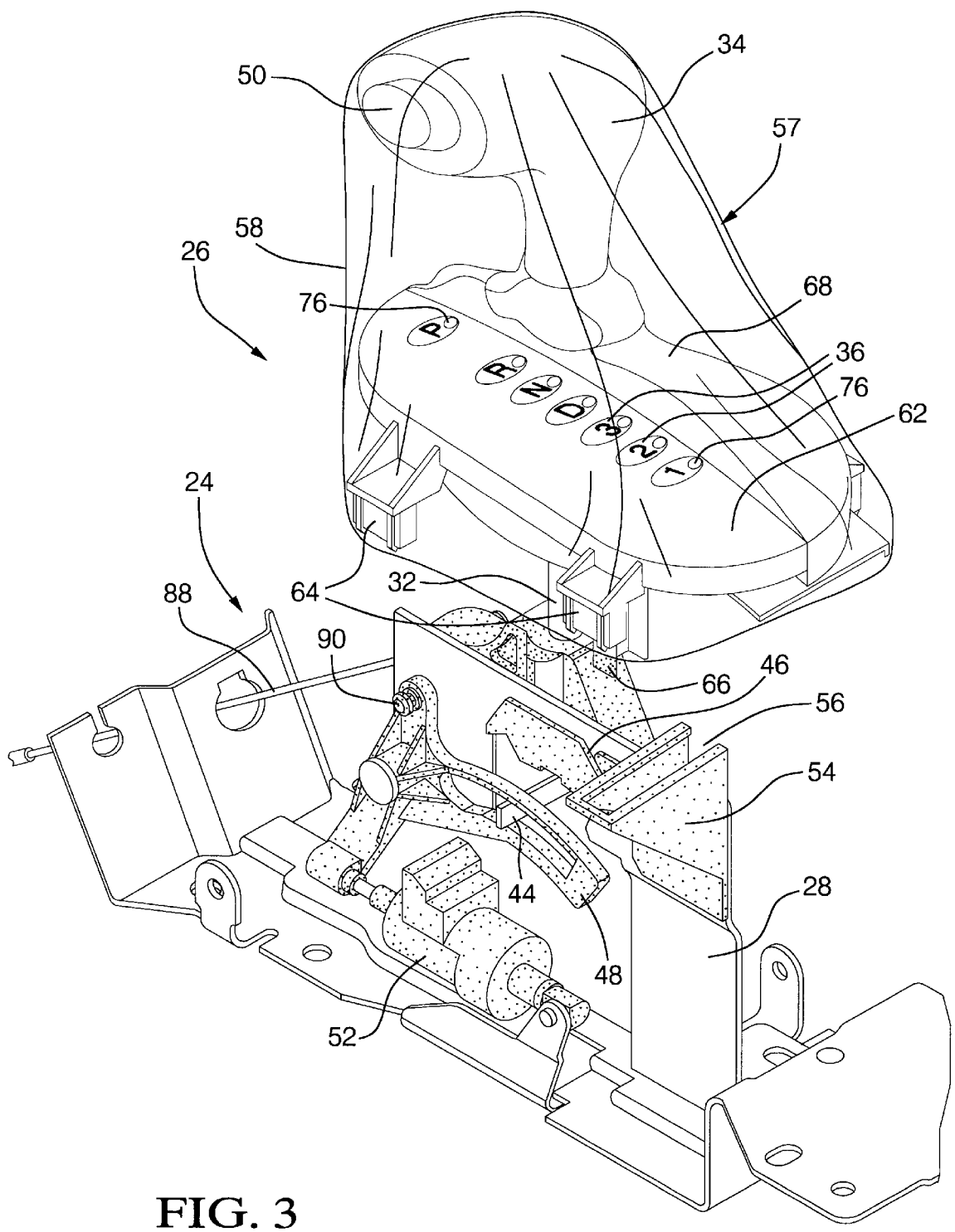
FIG. 3 is an isometric view of the shift lever and indicator subassembly with the indicator assembly in the restrained position.
Figure 4:
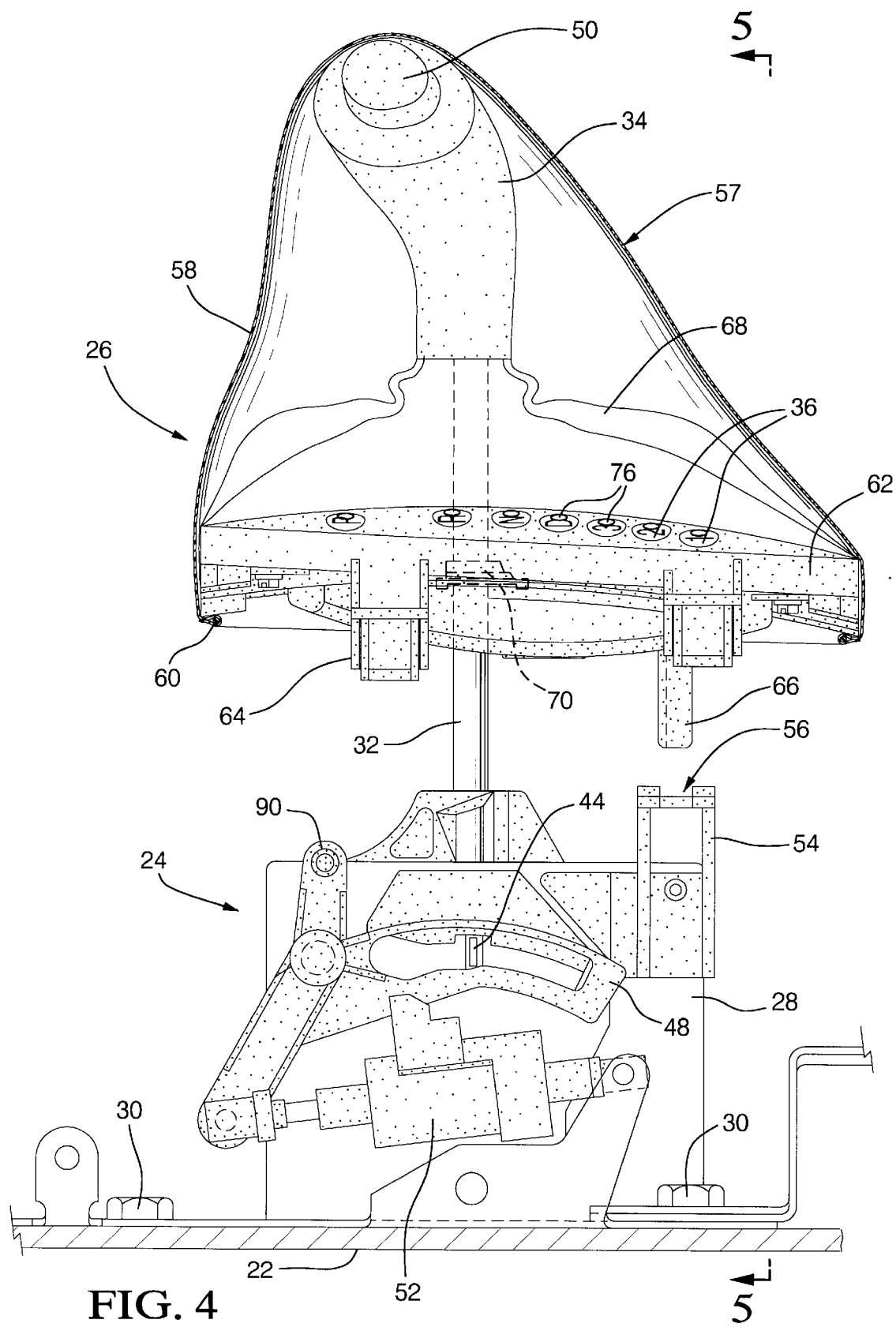
FIG. 4 is a side elevation view of a shift lever and indicator subassembly with the indicator assembly restrained above the shift lever assembly.

The base member 28 of the shift lever assembly 24 also has secured thereto an alignment bracket 54 which has a U-shaped opening 56. The opening 56 opens upwardly toward the indicia assembly 26 which, as seen in FIG. 3, is maintained above the base of the base 28 by a restraint 57 comprised of a clear hood portion 58 and an elastic band 60.

The indicia assembly 26 includes a housing 62 on which the indicia 36 is located. The indicia 36 includes a position for Park "P", Reverse "R", Neutral "N", Drive "D", Drive 3, Drive 2 and Drive 1. Normally termed the "PRNDL", the indicia 36 are visible to the operator to indicate the position that has been selected through manipulation of the handle 34.

The housing 62 also has integrally formed therewith a plurality of clips or tabs 64 and an alignment post 66. The indicia assembly 26 also includes a boot 68 which is secured to a portion of the housing 62 and to the handle 34 to close a portion of the indicia housing and the shift lever 32 below the handle 34.

Figure 5:
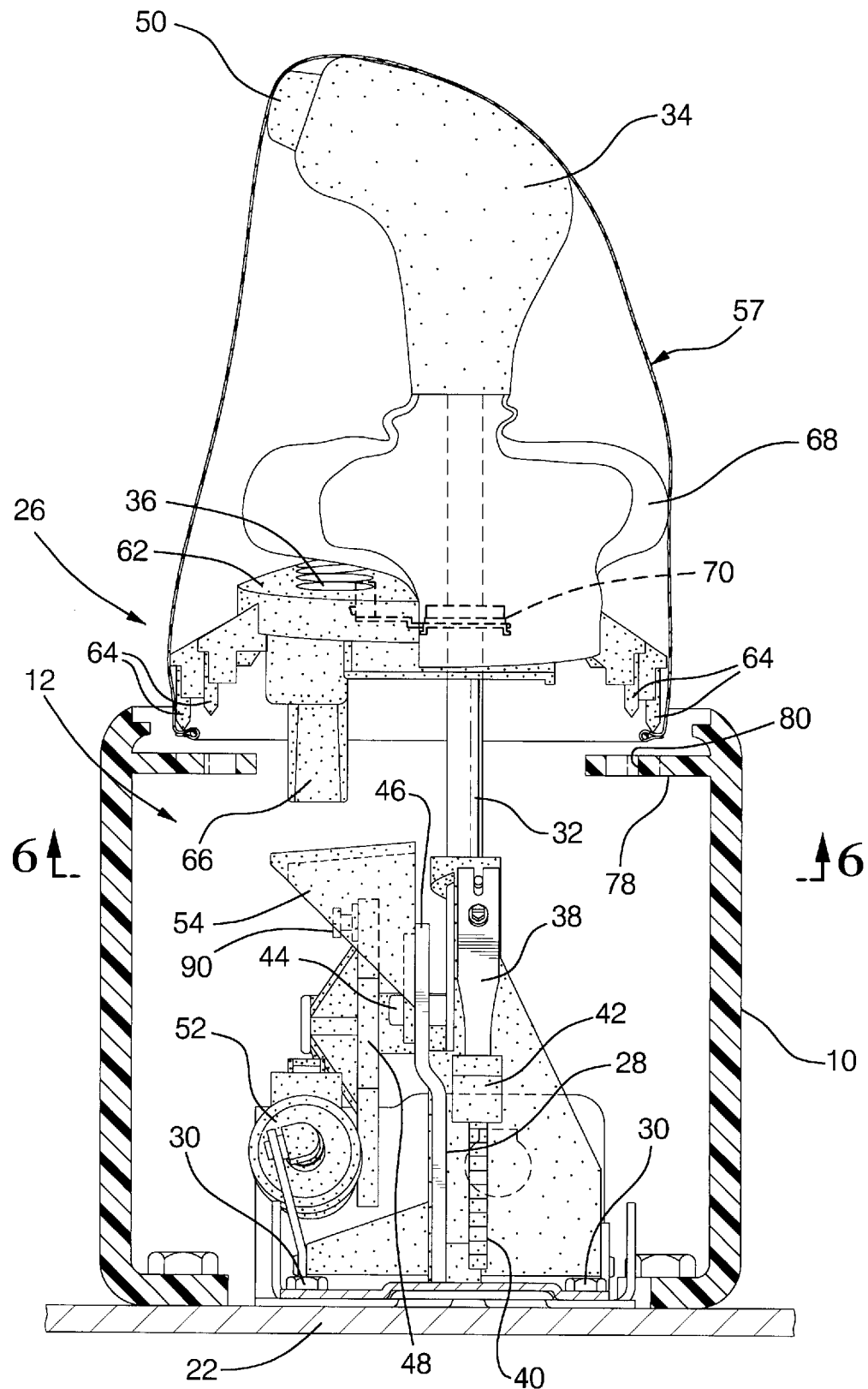
FIG. 5 is a view taken along line 5—5 of FIG. 4.
Figure 6:
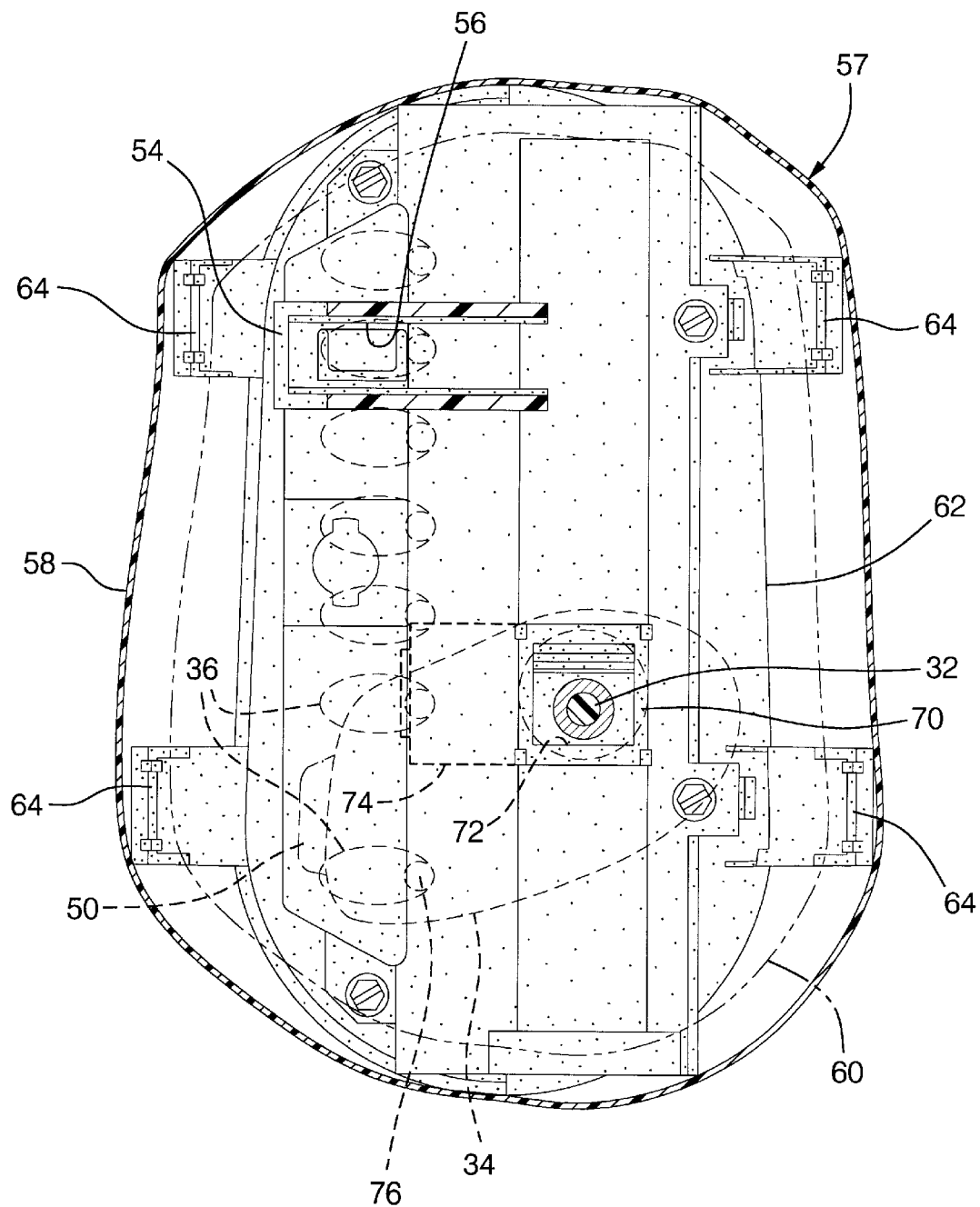
FIG. 6 is a view taken along line 6—6 of FIG. 5.

As best seen in FIGS. 5 and 6, the indicia assembly 26 has slidably disposed thereon a flag driver 70 which includes a box opening 72 surrounding the lever 32. The flag driver 70 has a flag extension 74 which extends leftward, as viewed in FIGS. 5 and 6, to selectively cover portions of the indicia 36. The flag 74 is generally a visible color, such as red, and each of the indicia 36 have a window 76 through which the flag 74 is visible when that particular transmission operating condition has been selected The console 10 has tabs 78 formed thereon in which are formed slots 80. The slots 80 are alignable with each of the clips 64 formed on the housing 62. During assembly, the clips 64 are inserted in the slots 80 of the tabs 78. These clips will maintain the indicia assembly 26 in proper orientation transverse to and vertically of the vehicle floor 22.

The post 66 is inserted through the opening 56 of the alignment bracket 54 during assembly of the indicia assembly 26 onto the console 10. The post 66 provides the proper longitudinal fore/aft alignment of the indicia assembly 26 relative to the shift lever assembly 24. Since the flag driver 70 and the associated flag 74 are positioned on the lever 32, the flag 74 will be properly aligned with the selected drive condition as illustrated by flag 74 being visible through the window 76 of the selected drive condition. The post 66 and bracket 54 do not restrain the housing 62 in either the transverse or vertical position.

As seen in FIG. 1, the trim cap 16 closes the opening 14 around the indicator assembly 26. As seen in the exploded view in FIG. 2, the trim cap 16 has a plurality of clips 82 which are aligned with slots 84 formed in tabs 78 on the console 10. Thus, the trim cap 16 is secured to the console 10 to inhibit removal thereof after final assembly.

During assembly of the shift lever and indicator assembly 12 into the vehicle, the assembly 12, as viewed in FIG. 3, is bolted or otherwise secured to the vehicle floor 22 while the indicia assembly 26 is secured in its restrained position by the restraint 57. After securement of the base 28 to the floor 22, transmission control cables, such as 88, are connected with the appropriate operating posts on the shift lever assembly 24. The cable 88, for example, is connected between the shift lever 32 and a transmission valve control lever, not shown. A post 90 on the lever 48 will be secured with an ignition interlock cable, not shown, in a well known manner.

As is well known, the ignition interlock cable prevents the manipulation of the lever 48 prior to placing the operator ignition key in a condition other than the "lock" condition. This is part of the brake transmission shift interlock system which is commonly used on most vehicles.

Following the securement of the base 28 to the floor pan and the connecting of the required cables, including electrical cables, not shown, the console 10 is inserted over the shift lever and indicia assembly 12 through the opening 14. The console 10 is generally inserted from the rear of the vehicle toward the front and is sufficiently flexible to manipulate around the indicator assembly 26 which is in a restrained position. The console 10 is fitted under the instrument panel 20 and secured to the floor 22 by fasteners, not shown.

The restraint 57 is then removed from the housing 62 such that the installer can move the indicator assembly 26 downward with the post 66 being inserted into the alignment bracket 54. The further downward movement of the housing 62 will result in the clips 64 engaging the slots 80, such that the housing 62 is secured transversely and vertically within the vehicle. At this point, the shift lever and indicator assembly 12 are presented in the vehicle without need for further adjustment to ensure that the shift lever 32 is recording or exhibiting the proper position through the indicia 36. Following the insertion of the housing 62, the trim cover 16 is inserted over the opening 14 to close the opening and provide the final securement of the assembly to the console 10.

It should be apparent from the above description that the shift lever assembly 24 and the indicia assembly 26 are preassembled at some point prior to installation within the vehicle. This preassembly permits the flag driver 70 to be properly installed on the lever 32. Following this installation, the handle 34 with button 50 can be installed on the lever 32 and secured to the boot 68 which has been previously secured to the housing 62. The restraint 57 is then installed over the handle 34 and under the housing 62 to secure the indicia assembly 26 in the vertical position shown in FIG. 3.

The restraint shown is a clear plastic hood and an elastic band which provides for the securement under the housing 62. This restraint device might take any of several forms substantially different from that shown. For example, a rubber strap can be inserted with clips under the housing 62 and over the handle 34. Adhesive tape or a rubberband can be utilized to restrain housing 62 in a preassembled condition. The particular restraint shown is the preferred form.

While the preferred assembly method is to install the assembly 12 prior to installation of the console 10, it is possible to install the console 10 and then install the shift lever and indicator assembly 12. However, this requires manipulating fasteners and cable connections in a tightly bounded area which would require more dexterity on the part of the installer. Also, it is quite obvious that other types of shift lever assemblies and indicia housing shapes might be utilized in the transmission control mechanism.

We claim:

1. A transmission shift lever and indicator assembly comprising:

a mounting bracket including a first alignment member;

a lever pivotally mounted on said bracket;

an indicator assembly including a housing and means movable in said housing in coordination with said lever for indicating the position of said lever, indicia for providing visual indication of said lever, a flag movable with said movable means and being alignable with said indicia, a second alignment member formed on said housing cooperating with said first alignment member to locate said indicator assembly in a predetermined longitudinal position relative to said bracket and a plurality of first clip members on said housing and;

a console, enclosing said mounting bracket, having an opening and mounting means cooperating with said first clip members for establishing a predetermined vertical position and a predetermined transverse position of said housing of said indicator assembly in said opening relative to said console.

2. The transmission shift lever and indicator assembly defined in claim 1 further comprising a trim plate having a plurality of second clip members cooperating with locating means formed in said console to locate said trim plate for covering said opening in said console vertically displaced above said bracket and at least partially surrounding said indicator assembly.

* * * * *